May 19, 1970   G. KOPP   3,512,716

EXHAUST NOZZLE FOR A JET AIRCRAFT ENGINE

Filed Dec. 18, 1967

United States Patent Office 3,512,716
Patented May 19, 1970

3,512,716
EXHAUST NOZZLE FOR A JET AIRCRAFT ENGINE
Gerhard Kopp, Munich, Germany, assignor to Entwicklungsring Sud GmbH, Munich, Germany
Filed Dec. 18, 1967, Ser. No. 691,591
Claims priority, application Germany, Jan. 31, 1967, E 33,304
Int. Cl. B64c 15/06
U.S. Cl. 239—265.29                            4 Claims

ABSTRACT OF THE DISCLOSURE

A nozzle for a jet aircraft which includes a pair of shell-shaped covers pivoted for rotation about a common axis. Means are included for selectively positioning the covers with respect to the flow path of the exhaust jet from the engine for selective obstruction thereof. The apparatus additionally includes a pair of flaps rotatably supported upon an axis parallel to the axis of rotation of the covers. The flaps serve to direct the jet exhaust stream and are shaped in the form of double-walled half shells reinforced by semi-circular ribs provided upon adjacent surfaces of the shells.

BACKGROUND OF THE INVENTION

This invention generally relates to an exhaust nozzle for a jet engine which is adapted to direct the path of the exhaust jet by a deflection means. The deflection means is in the form of a lattice structure positioned adjacent the exhaust orifice of the nozzle. The nozzle is particularly adapted for use with vertical take-off and landing aircraft, as well as short take-off and landing aircraft and especially serves to provide the latter with improved take-off and landing capabilities.

Conventional nozzles do not generally provide for the convenient mobility of the closing device nor for harmonizing the nozzle positioning force and the forces created by the fluid flow through the nozzles so as to permit rapid adjustment of the nozzle regardless of the flight speed experienced. In order to avoid the difficulties experienced by the use of conventional nozzles, the nozzle of the illustrated embodiment includes a closing means in the form of a pair of shell-shaped covers disposed in covering relation to a jet deflection lattice structure. The nozzle additionally includes a pair of flaps pivotally supported and coaxially mounted for rotation about an axis which extends generally transverse with respect to the direction of flight. The flaps are shaped in the form of double-walled half shells which are reinforced with semi-circular ribs. The adjacently disposed surfaces of each of the flap walls are provided with semi-circular ribs positioned for registration. The particular construction of the flaps distributes the exhaust gas forces to which the nozzle is subjected generally upon two respective locations.

According to the illustrated embodiment, a journal is provided on the inside of each of the nozzle flaps which projects toward the center line of the nozzle. The journal serves to secure the various components of the nozzle together so that the nozzle can be detached as an entire unit by following a few simple mechanical steps which will subsequently be described.

A main object of this invention is to provide an improved exhaust nozzle particularly adapted for use with jet aircraft engines. Other objects and advantages of the invention will become apparent with reference to the following description and accompanying drawings which show an illustrative embodiment of this invention.

DESCRIPTION OF THE PREFERRED EMBODIMENT

Figures 1, 2:
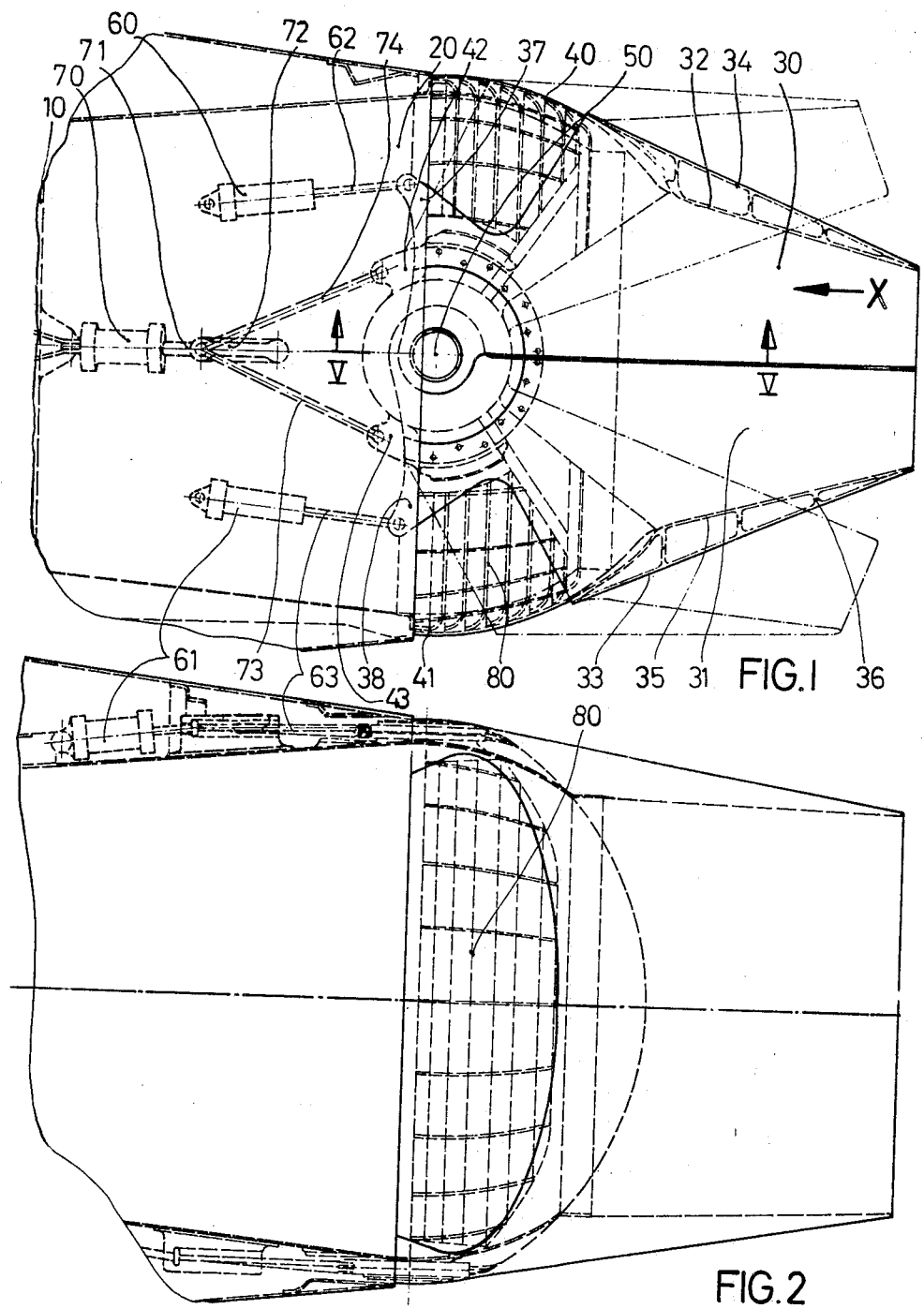
FIG. 1 is a top view of a portion of a jet aircraft including a nozzle incorporating certain features of this invention.
FIG. 2 is a side view of the nozzle illustrated in FIG. 1.
Figure 3:
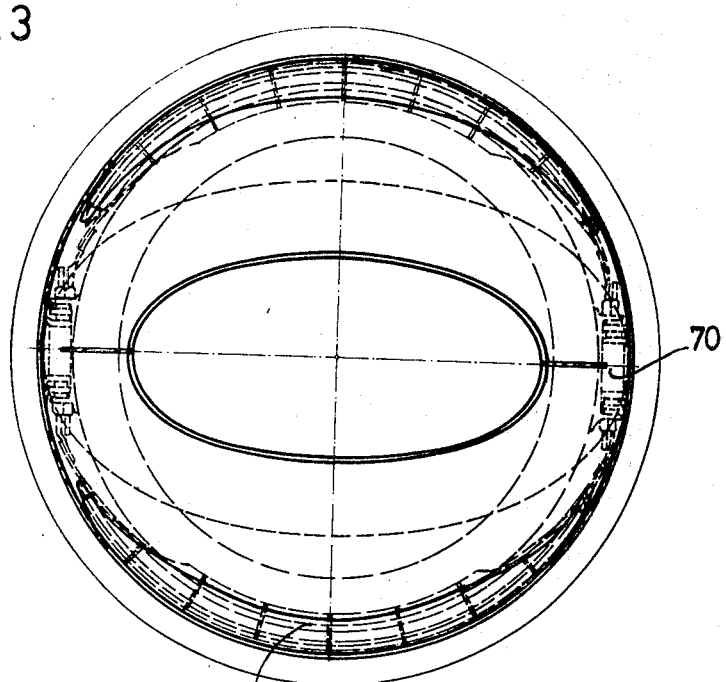
FIG. 3 is an end view of the nozzle of FIG. 1 taken substantially in the direction of the arrow X.
Figure 4:
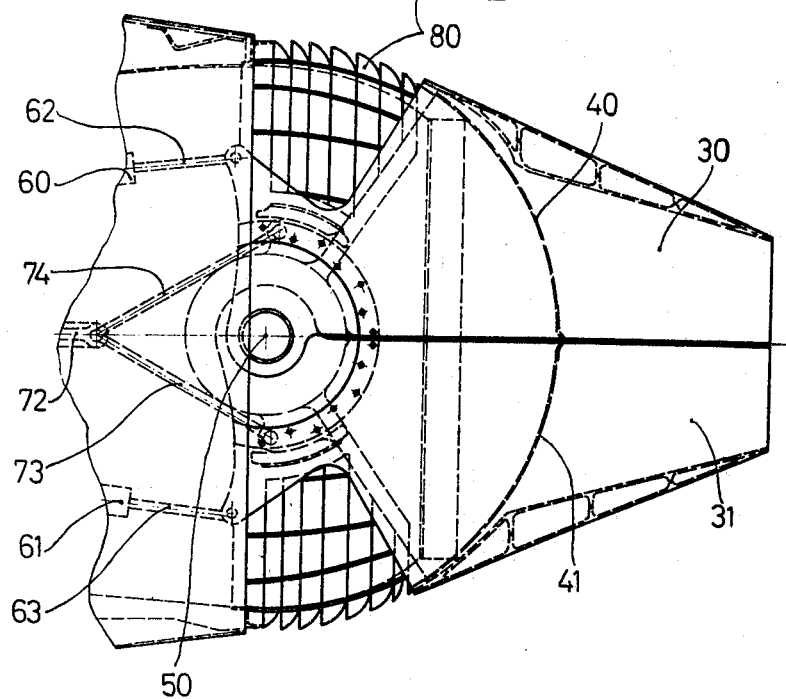
FIG. 4 is a partial top view similar to the view of FIG. 1 with the nozzle in a closed position.
Figure 5:
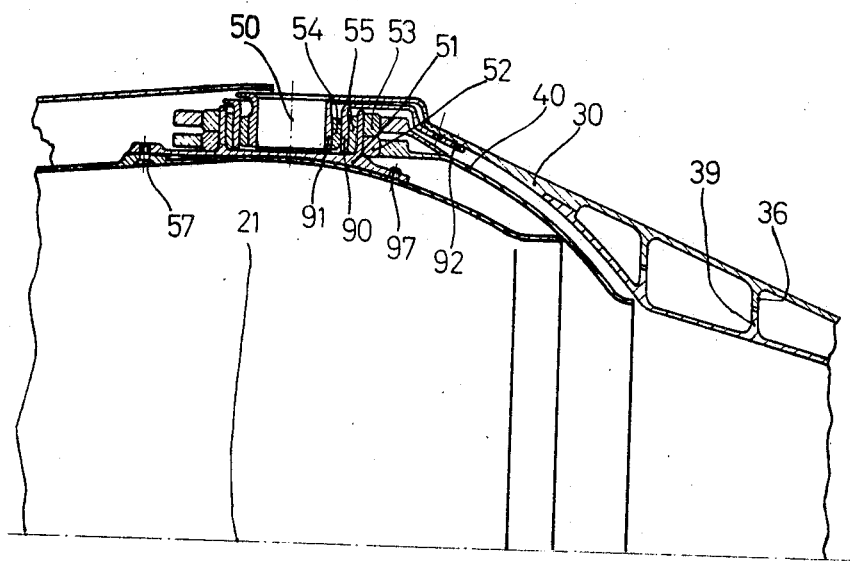
FIG. 5 is an enlarged, fragmentary, sectional view taken along the line V—V of FIG. 1.

With particular reference to FIG. 1, a fragmentary portion of a jet aircraft is shown which includes a jet engine 10 discharging through a nozzle 20. The nozzle 20 is provided with adjustable flaps 30 and 31. Serving to selectively obstruct the exhaust port of the nozzle are closing means 40 and 41 which comprise a pair of half-shell covers coaxially supported for rotation about an axis 50. The axis of rotation 50 extends transversely with respect to the axis of the exhaust path. The flaps 30 and 31 are rotatably supported by bearings 54 and 55. Positioned coaxially with regard to the bearings 54 and 55 are bearings 51, 52, and 53.

The nozzle flaps 30 and 31 are forward of double-walled half shells 32 and 35, respectively. The exterior surface of each of the double-walled half shells 32 and 35 of the respective nozzle flaps 30 and 31 is provided with semi-circular projecting ribs 36, while the interior surface of the double-walled half shells 33 and 34 are provided with similar semi-circular projecting ribs 39 which are in registration with the ribs 36.

The nozzle flaps 30 and 31 include integral swivel arms 37 and 38, respectively. As illustrated in FIG. 1, a portion of each of the arms 37 and 38 is journaled for rotation about the bearing 50. Serving to rotate the arms 37 and 38 so as to position the flaps 30 and 31 are actuating rods 62 and 63 actuated by means of hydraulically-operated actuators 60 and 61, respectively. Each of the nozzle flaps 30 and 31 is provided with a pair of actuation means. The closing means 40 and 41 are rotated about the axis of rotation 50 by means of a hydraulically-operated actuating means 70 which includes a rod 71 slidable along a path determined by a guide 72. One end of each of a pair of positioning rods 73 and 74 is maintained within the guide 72, whereas the remaining end is connected to projections 42 and 43 formed integral with the covering means 40 and 41. During cruise, the nozzle flaps 30 and 31, as well as the covering means 40 and 41 are closed; that is, positioned in obstructing relation with respect to a deflection lattice 80.

Figure 6:
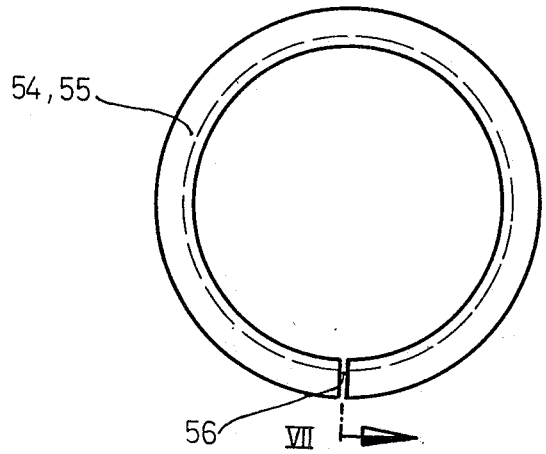
FIG. 6 is a frontal view of a component of the apparatus illustrated in FIG. 5.
Figure 7:
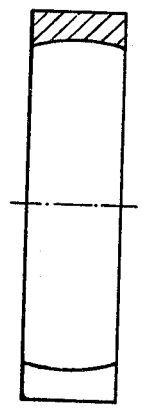
FIG. 7 is a sectional view taken along the line VII—VII of FIG. 6.

The bearings upon which the nozzle flaps 30 and 31 are supported include a pair of journals 90 and 91. Prior to final assembly, the bearing rings 54 and 55 are slid over the journals 90 and 91. Referring in particular to FIG. 6, the bearing rings 54 and 55 are each provided with an axial slot 56. The journals 90 and 91, together with the bearing rings 54 and 55 positioned thereon, are adapted to be inserted as a unit into the bearing 51 affixed to the housing of the engine 10. Upon insertion of the journals 90 and 91 into the bearing 51, the bearings are secured to their respective nozzle flaps 30 and 31 by means of screw fasteners 92. This apparatus provides an extremely flat bearing which facilitates compact installation. This feature is especially desirable when the aircraft includes twin engines since in such instances, the engines can be mounted quite close to the fuselage resulting in a reduced pod surface area.

Although but one specific embodiment of the invention has been herein shown and described, it will be understood that certain details of the construction shown may be altered without departing from the spirit and scope of this invention.

What is claimed is:

1. In combination with a jet engine nozzle which provides jet exhaust deflection by means of a lattice structure having an external surface, said lattice structure being positioned adjacent to the exhaust orifice of the nozzle, the apparatus comprising a pair of rotatably supported shell-shaped covers, the rotational axes of said covers being parallel, means for moving said covers along a path extending from a first position adjacent the exterior surface of said lattice structure for obstructing the flow of gas therethrough to a second position freely permitting the flow of gas through said lattice structure and a pair of flaps serving to control the size of the nozzle opening, said flaps being rotatably supported, each of said flaps having a common axis of rotation with one of said shell-shaped covers, said flaps being positioned so as to permit movement of said flaps along the exterior surface of said covers.

2. A nozzle in accordance with claim 1 wherein said axes of rotation of said covers and said flaps are coincident and wherein said nozzle flaps are mounted upon a pair of bearings each of which includes at least one journal and at least one bearing ring having a spherical inner surface, said bearing ring defining a single radial slot.

3. A nozzle in accordance with claim 2 wherein each of said nozzle flaps comprises a pair of spatially disposed adjacent shells, the adjacent surfaces of said shells being provided with semi-circular support ribs.

4. A nozzle in accordance with claim 3 wherein the support ribs of said adjacent shells are disposed in registration.

References Cited

UNITED STATES PATENTS

| | | | |
|---|---|---|---|
| 2,930,186 | 3/1960 | Ashwood et al. | 239—265.37 |
| 3,019,599 | 2/1962 | Colley | 239—265.29 |
| 3,024,604 | 3/1962 | Morley | 239—265.29 |
| 3,076,309 | 2/1963 | Brown et al. | 239—265.29 |
| 3,076,323 | 2/1963 | Auckton | 308—188 |
| 3,261,165 | 7/1966 | Smith | 239—265.29 |

EVERETT W. KIRBY, Primary Examiner

U.S. Cl. X.R.

239—265.37; 308—188